US007785138B2

(12) United States Patent
Bonnassieux et al.

(10) Patent No.: US 7,785,138 B2
(45) Date of Patent: Aug. 31, 2010

(54) WIRELESS ACCESS POINT INSTALLATION ON AN OUTLET BOX (75) Inventors: Vincent Bonnassieux, Mystic, CT (US); Mark E. Martich, Barrington, RI (US)

(73) Assignee: Ortronics, Inc., New London, CT (US)

( * ) Notice: Subject to any disclaimer, the term of this patent is extended or adjusted under 35 U.S.C. 154(b) by 1260 days.

(21) Appl. No.: 10/969,472

(22) Filed: Oct. 20, 2004

(65) Prior Publication Data
US 2005/0152306 A1 Jul. 14, 2005

Related U.S. Application Data
(60) Provisional application No. 60/535,774, filed on Jan. 12, 2004.

(51) Int. Cl.
*H01R 13/60* (2006.01)
(52) U.S. Cl. ..................................... 439/535
(58) Field of Classification Search .............. 370/338; 439/527, 533, 211, 218, 367, 929, 404, 535; 174/53; 200/297
See application file for complete search history.

(56) References Cited

U.S. PATENT DOCUMENTS

| 4,651,312 | A | * | 3/1987 | Honma et al. ................. 369/10 |
| 4,892,212 | A |   | 1/1990 | Andreyko |
| 4,950,840 | A |   | 8/1990 | Zetena |
| 5,135,411 | A | * | 8/1992 | Wiley et al. .................. 439/535 |
| 5,189,256 | A |   | 2/1993 | Epple |
| 5,559,922 | A |   | 9/1996 | Arnett |
| 5,574,256 | A |   | 11/1996 | Cottone |
| 5,638,947 | A |   | 6/1997 | Fenne |
| 5,659,650 | A |   | 8/1997 | Arnett |
| 5,735,714 | A |   | 4/1998 | Orlando et al. |
| 5,761,368 | A |   | 6/1998 | Arnett et al. |
| 6,081,356 | A |   | 6/2000 | Brane et al. |
| 6,108,331 | A |   | 8/2000 | Thompson |
| 6,116,946 | A |   | 9/2000 | Lewis et al. |
| 6,222,124 | B1 | * | 4/2001 | Pritchard et al. ............... 174/66 |
| 6,241,368 | B1 | * | 6/2001 | Depino ........................ 362/364 |
| 6,243,526 | B1 |   | 6/2001 | Garibay et al. |
| 6,475,022 | B2 | * | 11/2002 | Tomino et al. ............... 439/449 |
| 6,507,322 | B2 |   | 1/2003 | Fang et al. |

(Continued)

OTHER PUBLICATIONS

Lei, et al., A Power Management Scheme for the IEEE 802.11 Based WLANs. © 2005 IEEE, pp. 123-127.

(Continued)

*Primary Examiner*—Chandrika Prasad
(74) *Attorney, Agent, or Firm*—McCarter & English, LLP (57) ABSTRACT An access point device and system that offers Wi-Fi access and is easily integratable into its environment is provided. The access point device and system is advantageously well suited for integrating operative aspects of a Wi-Fi access point in a wall using, for example, standard switch and outlet boxes and/or standard wall plates. The access point device and system can advantageously be well suited for incorporating a wiring structure such as, for example, a 110 block or the like, suitable for use in connecting to a wired network. Further, the access point device and system may beneficially permit the integration of complementary connections within the access point including, for example, data, voice, video, CATV or other like connection types.

26 Claims, 8 Drawing Sheets

U.S. PATENT DOCUMENTS

| | | | |
|---|---|---|---|
| 6,566,602 B1 | 5/2003 | Miller et al. | |
| 6,616,005 B1 | 9/2003 | Pereira et al. | |
| 6,646,612 B1 * | 11/2003 | Noguchi et al. | 343/702 |
| 6,659,947 B1 | 12/2003 | Carter et al. | |
| 6,748,154 B2 | 6/2004 | O'Leary et al. | |
| 6,867,362 B2 | 3/2005 | Cherniski et al. | |
| 7,027,431 B1 | 4/2006 | Thompson | |
| 7,059,895 B2 | 6/2006 | Murano | |
| 7,184,422 B2 * | 2/2007 | Tseng et al. | 370/338 |
| 7,322,860 B2 * | 1/2008 | Martich et al. | 439/676 |
| 2002/0064992 A1 | 5/2002 | Tomino et al. | |
| 2002/0149670 A1 | 10/2002 | Gerszberg et al. | |
| 2002/0154487 A1 | 10/2002 | Weischhoff Van Rijn | |
| 2003/0062990 A1 | 4/2003 | Schaeffer, Jr. et al. | |
| 2003/0192055 A1 | 10/2003 | Aoki et al. | |
| 2004/0013098 A1 | 1/2004 | Tseng et al. | |
| 2004/0033817 A1 | 2/2004 | Gorsuch et al. | |
| 2004/0073597 A1 | 4/2004 | Caveney et al. | |
| 2004/0121648 A1 | 6/2004 | Voros | |
| 2004/0180573 A1 | 9/2004 | Chen | |
| 2004/0192353 A1 | 9/2004 | Mason et al. | |
| 2004/0196835 A1 | 10/2004 | Binder | |
| 2004/0224638 A1 | 11/2004 | Fadell et al. | |
| 2005/0144237 A1 | 6/2005 | Heredia et al. | |
| 2005/0152323 A1 | 7/2005 | Bonnassieux et al. | |
| 2006/0267936 A1 | 11/2006 | Hoeri | |

OTHER PUBLICATIONS

PCT International Search Report dated Jul. 1, 2008.
http://www.cisco.com/en/US/products/hw/phones/ps379/prod_installation_guide09186a00800a8689.html Printed Feb. 2, 2006, pp. 1-10.
http://www.nbxsoftware.com/accessories/wallmount.html, Printed: Feb. 2, 2006, p. 1.
AT&T, User's Manual for 900 MHz Digital Spread Spectrum Cordless Telephone 9400 Part 2, 1998, 7 Pages.
Product Literature, Wall Phone Jacks, Undated, Single Sheet.
Pericom Semiconductor Corporation, Application of the Week, Application: WiFi Access Point Reference Clocks, Oct. 15, 2003, Week 75, 2 pages.
3com Data Sheet, 3Com IntelliJack Switch Family Innovative "in the Wall" Solution: U.S.—Standard, May 2004, 9 pages.
3com Data Sheet, 3Com IntelliJack Switch Family Innovative "in the Wall" Solution: U.S.—Standard, Jun. 2004, 4 pages.
http://www.3com.com/products/en_US: 3com Product Details, 3Com IntelliJack Switch NJ220, Jun. 2004, 6 pages.
http://www.3com.com/products/en_US: 3com Product Details, 3Com IntelliJack Switch NJ100, Jun. 2004, 5 pages.
PCT International Search Report dated Aug. 30, 2007.

* cited by examiner

WIRELESS ACCESS POINT INSTALLATION ON AN OUTLET BOX

CROSS-REFERENCE TO PRIORITY APPLICATION

This patent application claims priority from U.S. Provisional Patent Application No. 60/535,774, filed on Jan. 12, 2004, which disclosure is hereby incorporated by reference as part of the present disclosure.

BACKGROUND OF THE DISCLOSURE

1. Technical Field

The present disclosure is directed to an advantageous device and system for providing Wi-Fi access and, more particularly, to a device and system easily integratable into its environment.

2. Background Art

As used herein, the term "Wi-Fi" is short for wireless fidelity and is meant to encompass any type of 802.11 network, whether 802.11b, 802.11a, 802.11g, dual-band, etc. The term "Wi-Fi" is currently promulgated by the Wi-Fi Alliance. Any products tested and approved as "Wi-Fi Certified" (a registered trademark) by the Wi-Fi Alliance are certified as interoperable with each other, even if they are from different manufacturers. A user with a "Wi-Fi Certified" product can use any brand of access point with any other brand of client hardware that also is certified. Typically, however, any Wi-Fi product using the same radio frequency (e.g., 2.4 GHz for 802.11b or 802.11g, and 5 GHz for 802.11a) will work with any other, even if such products are not "Wi-Fi Certified." The term "Wi-Fi" is further intended to encompass future versions and/or variations on the foregoing communication standards. Each of the foregoing standards is hereby incorporated by reference.

Thus, a wireless access point is a bridge between a wired and a wireless network. Wireless access points function like a wireless hub connecting all the wireless devices together and then connecting them to a wired network. A wireless network access point is an essential part of a wireless network, in that the access point facilitates connection to the Internet and/or another network, e.g., an intranet, extranet, WAN, LAN or the like. Many wireless access points are now built into wireless routers so that the features of a broadband router and a wireless access point are provided in one unit. Wireless access points generally have differing levels of performance, e.g., different wireless access points perform at varying data transmission speeds.

Many manufacturers are producing units that offer wireless access functionality. Thus, for example, the NETGEAR (Santa Clara, Calif.) wireless access points have been being built into broadband routers. LINKSYS (Irvine, Calif.), D-LINK (Fountain Valley, Calif.) and BELKIN (Compton, Calif.) also manufacture wireless broadband routers that include a built-in wireless access point.

Wireless access points are now appearing in what may be termed "hot spots" in hotels, train stations and airports. These access points are making wireless Internet connectivity available to travelers/individuals who can connect to the Internet or a desired network, e.g., a corporate network via a virtual private network (VPN), through wireless communication technology.

As used herein, the term "access point" encompasses a hardware device and/or associated software that acts as a communication hub for users of a wireless device to connect to a wired network, e.g., a local area network (LAN). Conventional access points generally provide a predetermined level of security for wireless communications that pass through the access point, and extend the physical range of service to which a wireless user has access.

Existing 802.11 access points suffer from various limitations and/or drawbacks. For example, current Wi-Fi access points are generally bulky, need to be connected via a patch cord, and often require an external power cord. Moreover, conventional Wi-Fi access ports are difficult to integrate into a desired environment, and frequently result in a non-desirable and/or unacceptable physical presence in the desired environment.

Thus, a need exists for improved devices that provide Wi-Fi access and that overcome the foregoing limitations and/or drawbacks.

SUMMARY OF THE DISCLOSURE

The present disclosure is directed to access point device(s) and system(s) that offer Wi-Fi access and that may be easily integrated into a desired environment. The disclosed access point device/system is advantageously well suited for integrating operative aspects of a Wi-Fi access point in a wall using, for example, standard switch and outlet boxes and/or standard wall plates. In addition, exemplary embodiments of the disclosed access point device/system are advantageously configured and dimensioned to incorporate a wiring structure such as, for example, a 110 block or the like, suitable for use in connecting to a wired network. Further, the access point device/system of the present disclosure may beneficially permit and/or facilitate the integration of complementary data communication connections within and/or as part of the access point including, for example, data, voice, video, CATV or other like connection and/or communication types.

A beneficial feature provided by the access point device and system of the present disclosure is found in that the access point device/system is easier to integrate, e.g., by retrofitting into an existing workstation and/or by installing the access point in or relative to a standard switch and/or outlet box at any level of a wall, ceiling or floor. The installation advantages provided by the access point device/system of the present disclosure generally translate to an access point that is discrete, visibly appealing, and at least substantially tamper resistant.

In an exemplary embodiment of the present disclosure, the access point device/system advantageously facilitates combining wired and wireless networks by, for example, providing wired ports and wireless access points in a single unit. This combination of features/functions beneficially reduces the installation time and the number of boxes necessary for establishing wired and wireless connection points. Additionally, according to an aspect of the present disclosure, at least one jack is operatively associated with the access point device/system so that electronics associated with the access point can be connected thereto so as to provide a dedicated network service. In another aspect of the present disclosure, a direct wiring connection (e.g., a 110 block wiring connection) may be advantageously used to provide a direct connection and easy access point installation by removing the need for a jack, thereby reducing the potential for electrical problems that an unnecessary connection (RJ45 plug and RJ45 jack) might otherwise cause/create.

In an alternative embodiment of the present disclosure, the access point device/system is free from any exposed wired network ports or jacks so as to facilitate more efficient dimensioning and compact sizing of the overall assembly.

According to an advantageous aspect of the present disclosure, the access point device/system is advantageously configured and dimensioned to be easily and reliably integrated with other wiring devices, such as, for example, by creating a triple gang face plate that includes both an electrical outlet and a Wi-Fi access point and/or a dual/multi gang face plate that includes both a switch and a Wi-Fi access point. The size/dimension of the access point device/system of the present disclosure is readily selected so as to correspond to the size/dimension of conventional residential/commercial face plates (e.g., decorator face plates and the like).

In another advantageous aspect of the present disclosure, the configuration of the access point device/system allows access points to be added to existing wired network(s) by simply replacing one existing data port with a wireless port, without any major disruption and without the additional cabling that a standard Wi-Fi access point requires. Still another aspect of the present disclosure is directed to the powering of a Wi-Fi access point through an Ethernet connection so as to thereby avoid the need for a separate power source/supply.

The Wi-Fi access point devices/systems presently disclosed have applicability for installations regardless of, and completely independent of, any applicable standards, whether now existing or developed in the future. Thus, the disclosed Wi-Fi access point devices and systems have applicability for any 802.11 network, whether 802.11b, 802.11a, 802.11g, dual-band, etc., but the disclosed devices/systems are expressly not limited to applications that conform to or satisfy such standards.

Thus, according to an exemplary embodiment of the present disclosure, an access point device is provided that includes: (i) housing means for accommodating Wi-Fi access point circuitry; (ii) Wi-Fi access point circuitry mounted with respect to the housing means; and (iii) communication means mounted with respect to the housing means and adapted to provide network communication to the Wi-Fi access point circuitry. The housing means is advantageously configured and dimensioned for installation with respect to an outlet box.

In further embodiments of the present disclosure, the housing means takes the form of a housing structure that is defined at least in part by a back plate. The housing means is generally adapted to engage with a detachable cover plate. Indeed, the back plate and the cover plate generally define an enclosed region, and the Wi-Fi access point circuitry is typically positioned within the enclosed region. The access point device of the present disclosure generally includes vent openings for venting heat generated within the enclosed region. The vent openings may be defined in the cover plate, e.g., along a side edge thereof.

The communication means may include at least one jack operatively associated with the back plate. The jack is typically in electronic communication with the Wi-Fi access point circuitry. The back plate typically defines a front face, a rear face and a mounting opening extending through the back plate. The jack(s) are typically mounted with respect to the mounting opening formed in the back plate, with the jack(s) extending from the rear face of the back plate. The jacks are typically positioned with respect to the back plate such that the jack(s) extend into the outlet box when the housing means is installed with respect to the outlet box. The jack may be mounted with respect to the back plate such that IDC contacts extend rearwardly from the back plate and into the outlet box region.

According to exemplary embodiments of the present disclosure, the IDC contacts are angularly oriented with respect to the back plate. The IDC contacts may be advantageously positioned at an angle of about 30° to about 60° relative to the back plate, e.g., about 45°. The communication means may also include one or more 110 blocks operatively in electronic communication with the Wi-Fi access point circuitry. The access point device may also include at least one additional communication element mounted with respect to the housing means, e.g., one or more data transmission elements, one or more audio transmission elements, one or more video transmission elements, one or more CATV transmission elements, a power connection, a wiring element, and combination(s) thereof.

The housing means is generally configured and dimensioned for installation with respect to at least one of a single gang box, a dual gang box, a triple gang box and a multiple gang box. The back plate of the housing means may include mounting apertures that are positioned to facilitate mounting of the housing means with respect to a rectangular outlet box and/or a circular outlet box.

The disclosed access point device may be provided with communication means that includes a plurality of jacks mounted with respect to the housing means. In addition, the Wi-Fi access point circuitry may include one or more antenna, and the antenna may include diversity antenna. The disclosed access point device may also advantageously include at least one cable management structure positioned with respect to the housing means. The cable management structure is generally positioned to minimize RF interference stemming from electrical components associated with the housing means. The electrical components may include one or more cables, one or more antenna and one or more printed circuit boards (PCBs) associated with the Wi-Fi access point circuitry. Exemplary cable management structures include one or more cable guide structures configured to direct cable within the housing means.

The disclosed access point device may also include means for focusing RF energy within a predefined area. The focusing means may include one or more metallic surfaces operatively associated with the housing means. The metallic surfaces operate to inhibit RF signals from propagating without or beyond the predefined area.

The present disclosure also provides a network device that includes a housing for accommodating Wi-Fi access point circuitry, the housing including a detachable face plate and a back plate, wherein the back plate includes: (i) an outwardly extending communication device operatively associated therewith for providing dedicated network communications to the Wi-Fi access point circuitry, and (ii) means for enabling a network device to be operatively connected to a new workstation outlet or an existing workstation outlet. The network device may further include at least one additional communication element mounted with respect to the housing means, e.g., one or more data transmission elements, one or more audio transmission elements, one or more video transmission elements, one or more CATV transmission elements, a power connection, a wiring element, and combinations thereof.

The present disclosure also provides advantageous methods for installing access point devices, e.g., a method of installing an access point device that includes:

providing a workstation outlet box having one or more jacks operatively associated therewith;

separating at least one of the one or more jacks from the workstation outlet box to make at least one network cable available;

providing an access point device that includes a back plate, Wi-Fi access point circuitry and a communication element in electronic communication with the Wi-Fi access point circuitry and extending rearwardly from the back plate;

connecting the at least one network cable to the rearwardly extending communication element; and installing the access point device with respect to the workstation outlet box.

In the disclosed method, the step of connecting the network cable to the communication device may be accomplished via one or more 110 blocks. A cover plate may be mounted with respect to the back plate to define a housing within which is positioned the Wi-Fi access point circuitry. In addition, the housing of the access point device generally includes mounting structures that facilitate the step of installing the access point device with respect to the workstation outlet box.

In a further method according to the present disclosure, a method for installing an access point device is provided that includes the steps of:

providing an outlet box;

installing a recessed plate to the outlet box;

providing the recessed plate with a jack;

connecting the jack to an access point via a patch cord; and installing the access point device over the jack so that the jack is behind the access point device.

Additional advantageous structural features and functionalities associated with the disclosed Wi-Fi access point device(s)/system(s) of the present disclosure will be readily apparent to persons skilled in the art from the detailed description which follows, particularly when reviewed together with the figures appended hereto.

BRIEF DESCRIPTION OF THE DRAWINGS

To assist those of ordinary skill in the art to which the subject matter of the present disclosure appertains to make and use the disclosed access point devices and systems, reference is made to the accompanying figures wherein.

DESCRIPTION OF EXEMPLARY
EMBODIMENT(S)

According to the present disclosure, access point (AP) devices/systems suitable for providing, inter alia, Wi-Fi access are provided. The access points (APs), as disclosed herein, are well suited for integrating operative aspects of a Wi-Fi access point in a wall, incorporating a wiring structure (e.g., a 110 block) suitable for use in connecting to a wired network, and/or advantageously permitting integration of complementary connections (e.g., data, voice, video, CATV, etc.) within the access point. The disclosed Wi-Fi access point devices/systems have applicability for installations regardless of, and independent of, any applicable standards, whether now existing or developed in the future. Thus, the disclosed Wi-Fi access point devices/systems have applicability for any 802.11 network, whether 802.11b, 802.11a, 802.11g, dual-band, etc., but the disclosed devices/systems are expressly not limited to applications that conform to or satisfy such standards.

Figure 1:
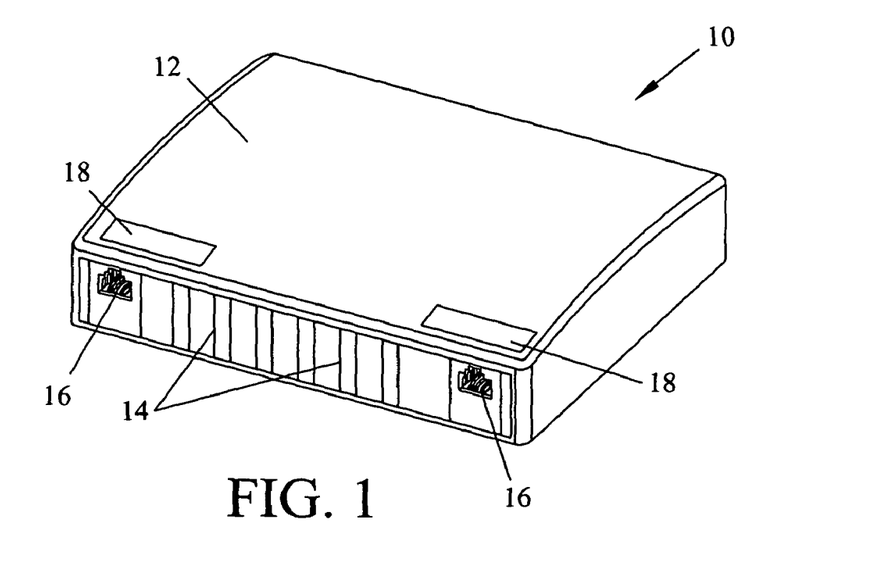
FIG. 1 is a perspective view of an illustrative embodiment of an access point (AP) according to the present disclosure.

With reference now to the drawings and in particular to FIG. 1, there is shown by way of illustrative example an access point (AP) in accordance with the present disclosure generally represented by reference numeral 10. The access point (AP) 10, as shown, has a housing 12 suitable for accommodating Wi-Fi access point circuitry. The housing 12, as shown, may also have vents 14. The housing 12 is suitable to accommodate one or more first jacks 16, e.g., RJ45 jacks or the like, mounted with respect thereto. The housing 12 preferably has a substantially low overall profile with label means or labeling locations 18 proximate each of the one or more first jacks 16 to facilitate proper interconnection with such first jacks.

Figure 2:
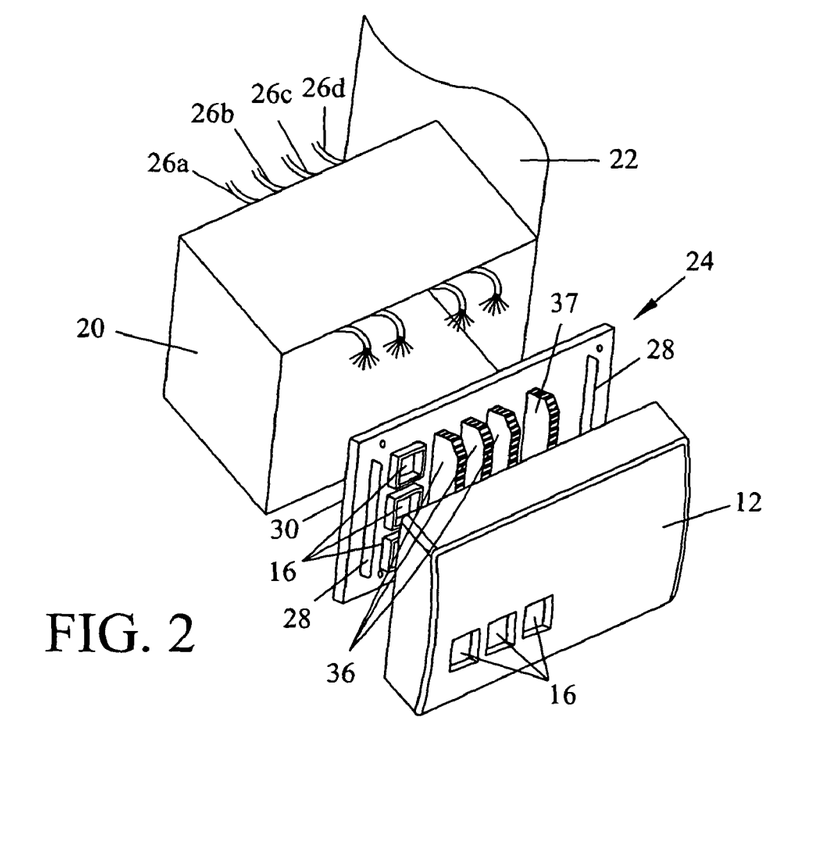
FIG. 2 is an exploded schematic view of an installation in accordance with an illustrative aspect of the present disclosure.

Referring to FIG. 2, there is shown an exemplary access point device/system installation for providing Wi-Fi access according to the present disclosure. As shown, the access point device/system installation, in one aspect of the present disclosure, can be accomplished by providing a predefined workstation gang box 20 (e.g., single gang, double gang, triple gang or multiple gang) suitable for mounting to a support member 22 and also providing Wi-Fi access point circuitry 24 suitable for operatively interacting with wired and wireless networks. The Wi-Fi access point circuitry 24 is preferably accommodated by the housing 12, which housing in turn is operatively connectable to the box 20 as desired.

The box 20, although shown mounted directly to the support member 22 (e.g., a stud), may equally be mounted using alternative mounting techniques as may be known to those skilled in the pertinent art. That is, the access point device/system installation may, for example, be surface mounted and/or mounted under or with respect to a ceiling or other building structure. The flexibility in mounting regimens available according to the present disclosure facilitates effective inventory management, because multiple inventories to meet different mounting applications are not required. As shown, one or more cables (e.g., cables 26a, 26b, 26c, 26d) including, for example, four twisted wire pairs can be introduced to the box 20 in a conventional manner (e.g., through knock-out openings in the rear thereof). Any one or more of these cables enables communication between the Wi-Fi access point circuitry 24 and a dedicated network service.

The Wi-Fi access point circuitry 24, as shown, includes one or more antennas 28 suitable for communicating with a wireless device (not shown). Each antenna 28 can be of conventional design and may be combined and/or supplemented to provide lesser/greater numbers of antenna without departing from the spirit or scope of the present disclosure. Each antenna 28 is mounted with respect to a substrate 30 (e.g., a predefined printed circuit board (PCB)) that may be sized and shaped to be effectively accommodated by the housing 12 as well as to cooperate with a conventional outlet box. A plurality of electronic components also may be mounted with respect to the substrate 30 and wired with respect to ancillary components of the access point (AP) 10, such as, for example, to effect desired noise reduction and/or other electronic communication, transmission and/or processing functionalities.

With continued reference to FIG. 2, the Wi-Fi access point circuitry 24, in a preferred aspect of the present disclosure, may, for example, advantageously include one or more 110 blocks 36 for use in one or more printed circuit mount jack connections and at least one 110 block 37 for use in at least one access point connection. The precise number of 110 blocks 36, 37 may be varied based on anticipated wiring requirements, as will be apparent to persons skilled in the art. In addition, the first jacks 16 accommodated by the housing 12 for receipt of conventional plugs (not shown) may be operatively associated with the Wi-Fi access point circuitry 24 and is typically employed for voice, video and/or data communications. Additional first jacks may be provided, as desired. Also, conventional wiring connections are typically incorporated into the rear of the first jacks 16 so as to facilitate communications therethrough.

Once appropriate connection between the cables associated with the box 20 and the Wi-Fi access point circuitry 24 is accomplished so as to provide a dedicated network service, the housing 12, which accommodates the Wi-Fi access point circuitry 24, is generally mounted with respect to the box 20 using conventional mounting techniques (e.g., using a plurality of fasteners).

Utilizing the 110 blocks 36 to connect to a wired network advantageously permits integration of complementary connections (e.g., data, voice, video, CATV, etc.) within the access point (AP) through interaction with the first jacks 16. Substantial benefits and conveniences are realized by operatively associating Wi-Fi access point circuitry 24 with a conventional gang box 20 such as described herein.

Figure 3:
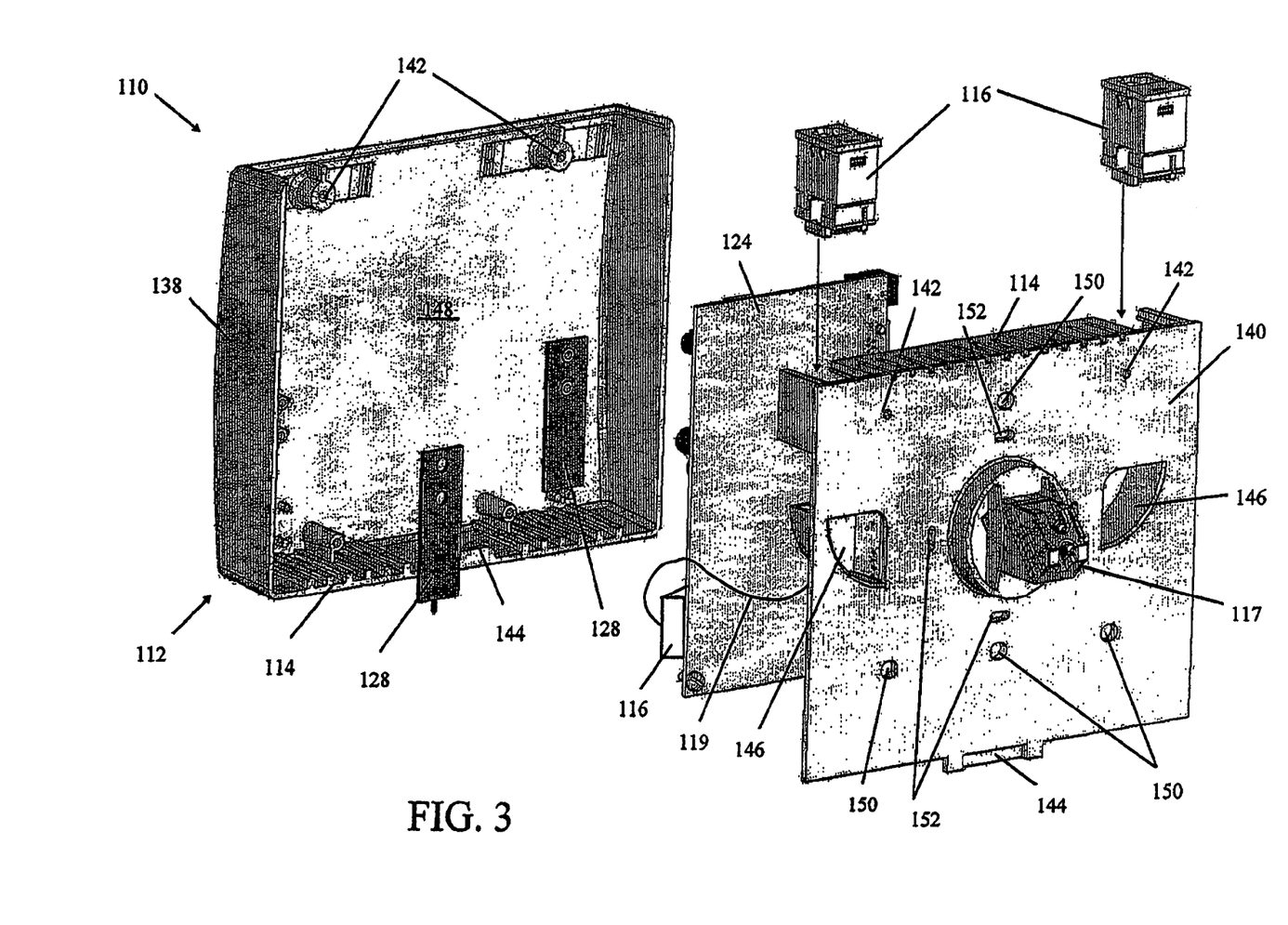
FIG. 3 is an exploded schematic view of the access point (AP) of FIG. 1 according to an alternative aspect thereof.

With reference to FIG. 3, an access point (AP) in accordance with an alternate aspect of the present disclosure is indicated generally by the reference numeral 110. The access point (AP) 110 is similar to the access point (AP) 10 previously described with respect to FIGS. 1 and 2 and, therefore, to the extent appropriate, like reference numerals preceded by the numeral "1" are used to indicate similar elements. The access point (AP) 110, as shown, includes a housing 112 that is divided into two parts, a first plate 138 (e.g., a face plate) and a second plate 140 (e.g., a back plate). The first and second plates 138, 140 are connected by complementary first and second connecting means 142, 144 associated with each plate. The first and second plates 138, 140 cooperate to effectively accommodate Wi-Fi access point circuitry 124 as well as any one or more first jacks 116.

In an aspect of the present disclosure, the housing 112 may be provided with one or more cable management structures. For instance, as shown, the second plate 140 of the housing 112 has one or more cable guides 146 suitable for directing one or more cables and minimizing or inhibiting RF interference created by such cables being in close proximity to one or more of the antennas 128 associated with the Wi-Fi access point circuitry 24.

The housing 112, in another aspect of the present disclosure, may have and/or accommodate one or more metallic surfaces 148 that operate as RF reflectors focusing RF energy within a predefined area (e.g., a room) and minimizing or inhibiting such RF energy from propagating without or beyond the predefined area. This RF reflecting feature may improve overall network performance and security.

According to a further aspect of the present disclosure, the housing 112 may be provided with at least two different mounting means, a first mounting means 150 for mounting to a predefined structural element (e.g., an electrical box having a rectangular pattern) and a second mounting means 152 for mounting to another predefined structural element (e.g., an electrical box having a circular pattern). Additional and/or alternative mounting means may equally be provided as needed in order to allow the access point (AP) 110 to be operatively connected to different workstation boxes or the like.

Referring still to FIG. 3, the Wi-Fi access point circuitry 124 is preferably substantially similar to that which was previously discussed, with the exception that the 110 block 37 has been replaced by at least one second jack 117 intended for use in at least one access point connection. The second jack 117, which is preferably operatively associated with the second plate 140, is suitable to provide a 110 IDC punch down connection. The second jack 117 is operatively connected to the Wi-Fi access point circuitry 24, via, for example, a short jumper 119 or the like. Accordingly, the second jack 117 operates similarly to the 110 blocks 36 at least in that it enables the Wi-Fi access point circuitry 124 to be operatively connected to a wired network. The second jack 117 may also cooperate with the first jacks 116 so as to facilitate integration of complementary connections (e.g., data, voice, video, CATV, etc.) within the access point (AP).

Figure 4:
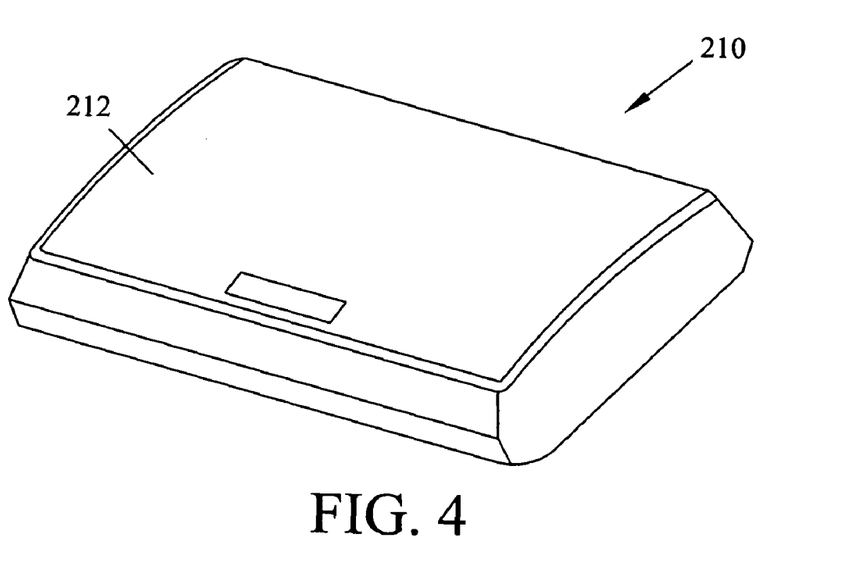
FIG. 4 is a perspective view of another illustrative embodiment of an access point (AP) according to the present disclosure.
Figure 5:
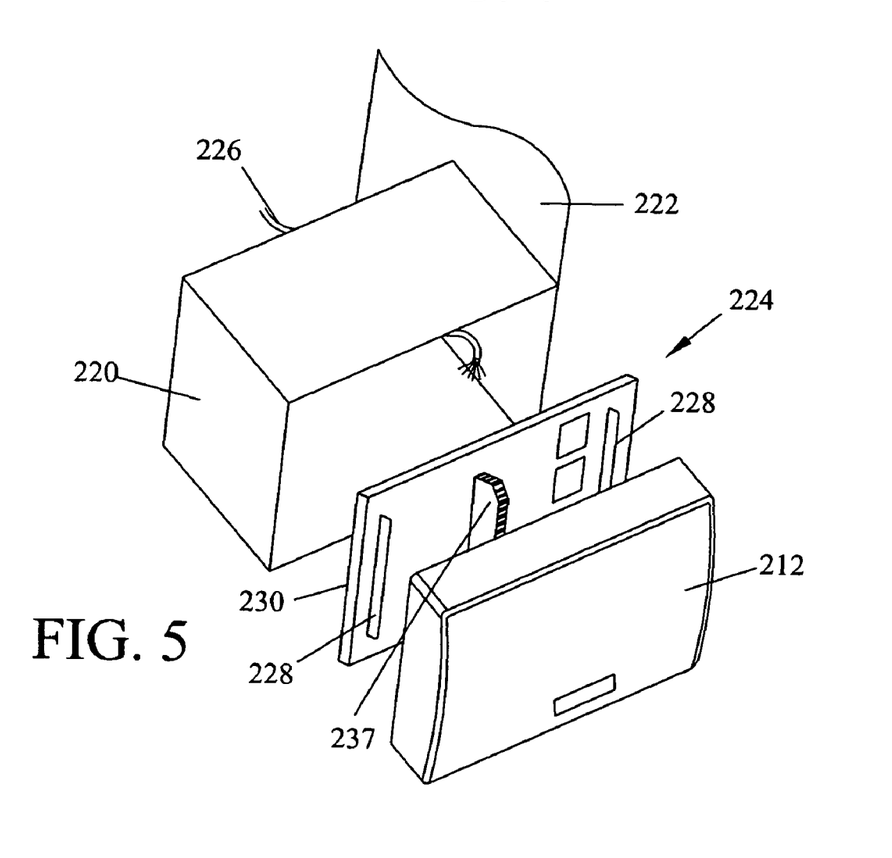
FIG. 5 is an exploded schematic view of an installation in accordance with another illustrative aspect of the present disclosure.

Turning to FIG. 4, another exemplary access point (AP) in accordance with the present disclosure is indicated generally by the reference numeral 210. The access point (AP) 210 includes features and elements similar to those associated with the access points (AP) 10, 110 previously described with respect to FIGS. 1 to 3 and therefore, to the extent appropriate, like reference numerals preceded by the numeral "2" are used to indicate like elements. The access point (AP) 210, as shown, preferably includes a housing 212 with a substantially low overall profile and free from any accessible communication ports or jacks. As shown in FIG. 5, the housing 212 cooperates with a predefined workstation gang box 220 and Wi-Fi access point circuitry 224 to effectuate an access point device/system installation suitable for providing Wi-Fi access according to the present disclosure. The Wi-Fi access point circuitry 224 is preferably suitable for operatively interacting with wired and wireless networks. The Wi-Fi access point circuitry 224 is preferably accommodated by the housing 212, which housing in turn is operatively connectable to the box 220 as desired.

Figure 6:
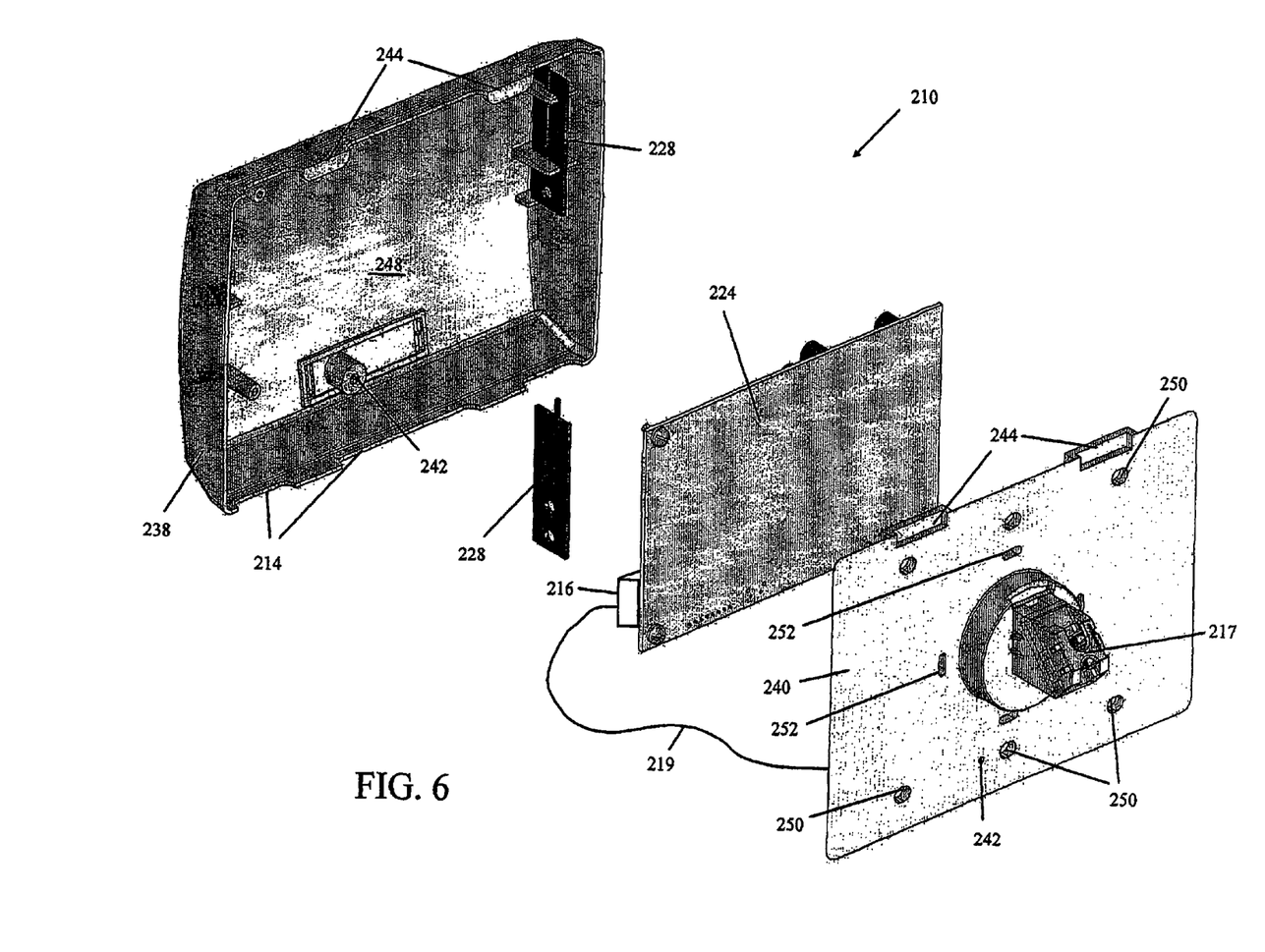
FIG. 6 is an exploded schematic view of the access point (AP) of FIG. 4 according to an alternative aspect thereof.

The box 220 is, similar to the box 20, provided with at least one cable 226 enabling communication between the Wi-Fi access point circuitry 224 and a dedicated network service. The Wi-Fi access point circuitry 224 includes one or more antennas 28 mounted with respect to a substrate 230 and suitable for communicating with a wireless device (not shown). Any of a variety of other electronic components may likewise be mounted with respect to the substrate 230. As shown, the Wi-Fi access point circuitry 224 includes a single 110 block 236 for use in cross-connection of data communication lines. Alternatively, as shown in FIG. 6, the Wi-Fi access point circuitry 224 cooperates with a jack 217 suitable to provide an IDC punch down connection. The jack 217 is operatively connected to the Wi-Fi access point circuitry 24 so as to operate similarly to the 110 block 236 at least in that it enables the Wi-Fi access point circuitry 224 to be operatively connected to a wired network.

Figure 7:
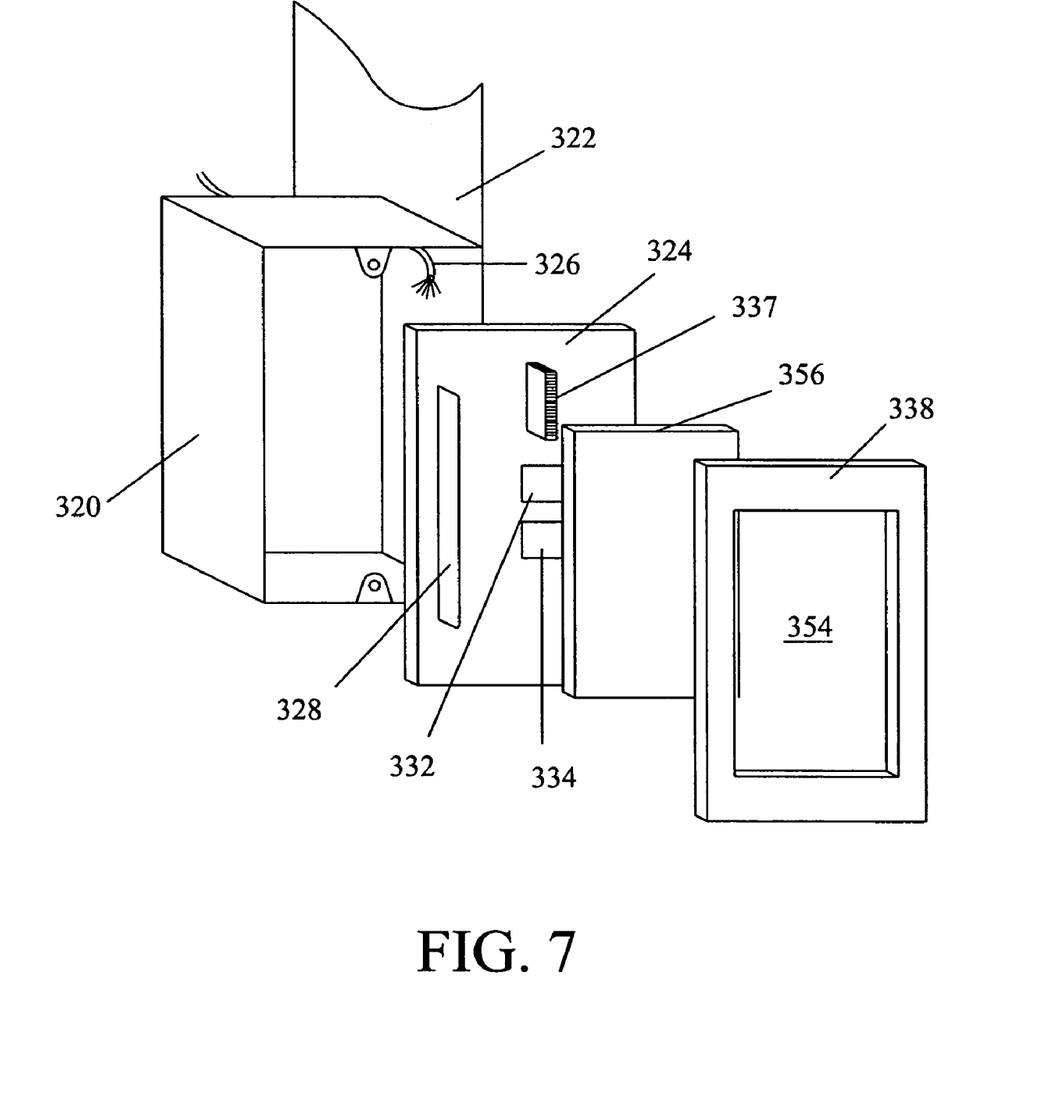
FIG. 7 is an exploded schematic view of a further exemplary embodiment of an access point (AP) according to the present disclosure.

Referring to FIG. 7, still another exemplary access point device/system installation for providing Wi-Fi access according to the present disclosure is schematically depicted. The access point device/system installation includes features and elements similar to those associated with the access points (AP) 10, 110 and 210 heretofore described and therefore, to the extent appropriate, like reference numerals preceded by the numeral "3" are used to indicate like elements. As shown, an access point (AP) 310 is configured and dimensioned for cooperation/mounting with respect to a single gang box 320. Access point (AP) 310 includes at least one antenna 328 and a direct 110 block 336 type connection. Power may be supplied to access point (AP) 310 by, for example, a cable 326 which supplies power over Ethernet, thereby drawing power for operation of Wi-Fi access point circuitry 324 associated with access point (AP) 310 from a network source.

A standard face plate 338 with at least one opening 354 defined therein can be employed as a standard cover. The face plate 338 may include decorative features, as are known in the art. A protecting member 356 suitable to protect the Wi-Fi access point circuitry 324 and/or other structures/features associated with the access point (AP) 310 may also be provided, preferably between the face plate 338 and the Wi-Fi access point circuitry 324. As shown, the protecting member 356 is preferably dimensioned to exceed the dimension of the opening 354.

Figure 8A:
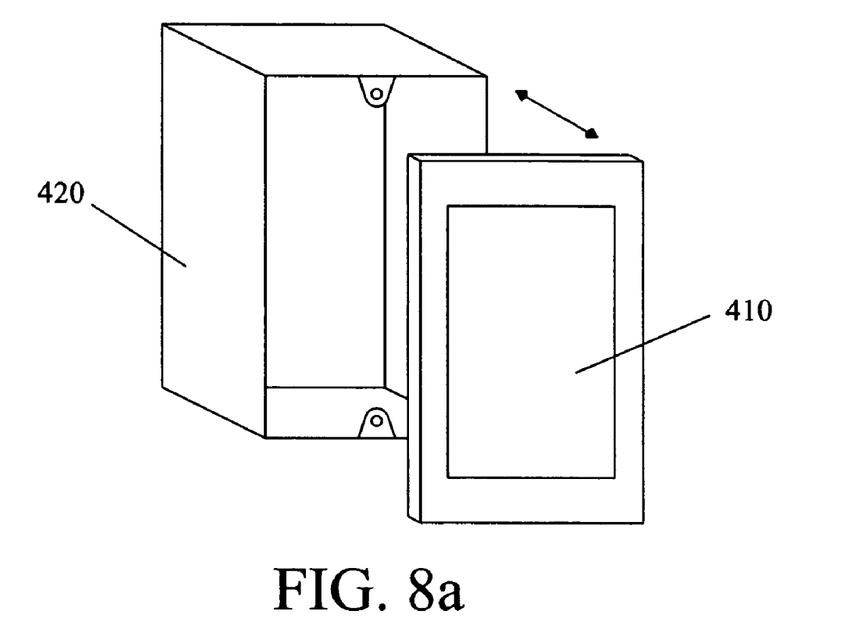
FIGS. 8a to 8d depict a series of exemplary implementations according to the present disclosure.
Figure 8B:
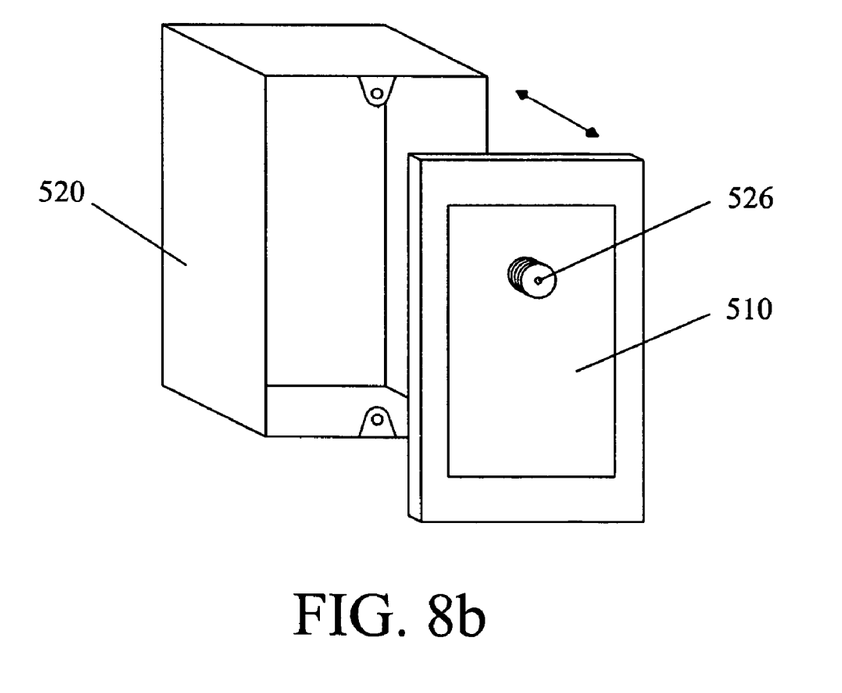
Figure 8C:
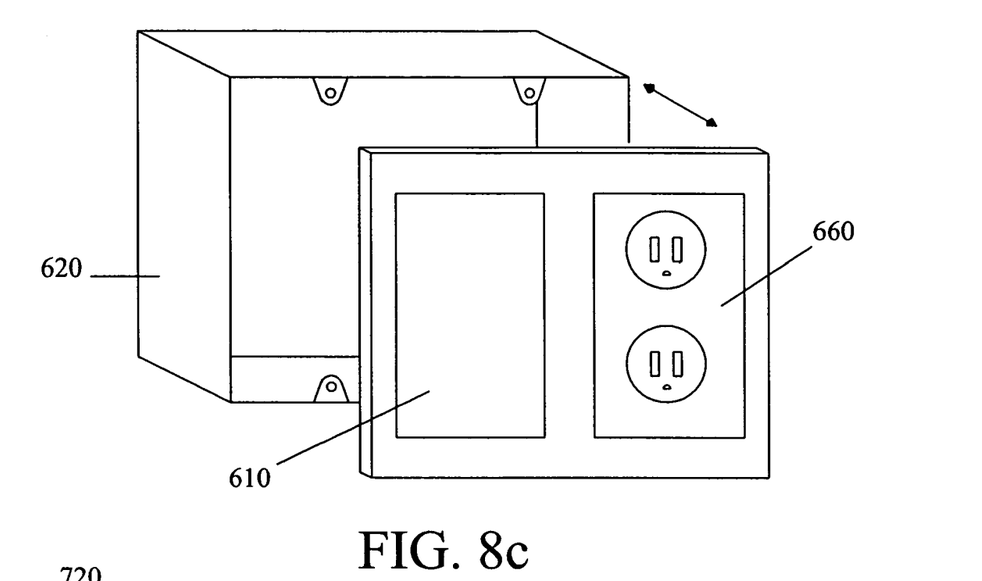
Figure 8D:
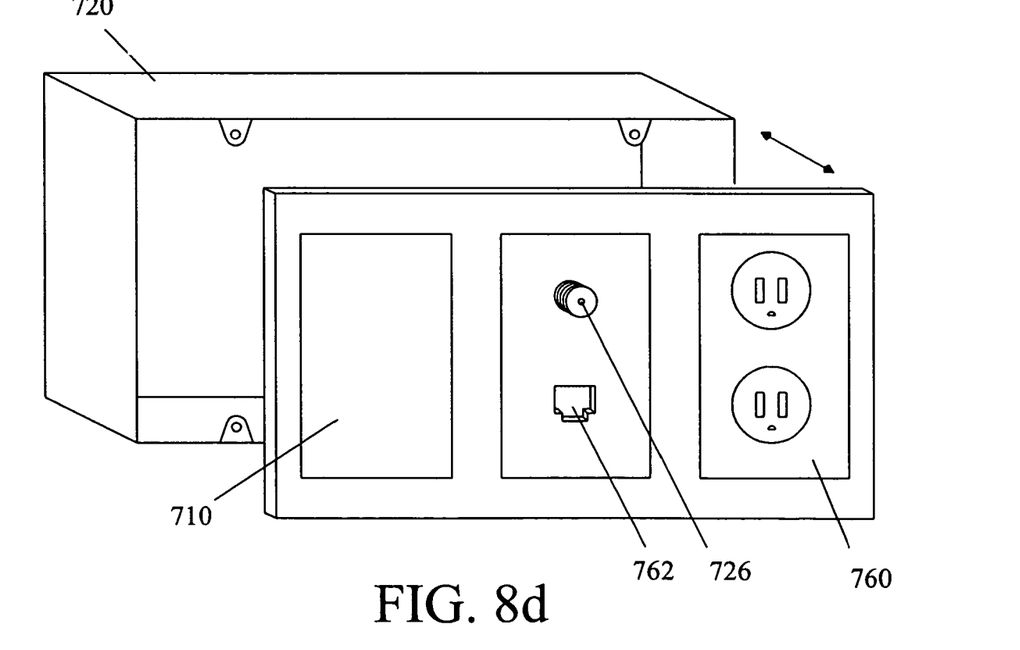

Referring to FIGS. 8a to 8d, a series of exemplary implementations according to an illustrative aspect of the present disclosure are schematically depicted. FIG. 8a demonstrates an access point (AP) 410 mounted with respect to a single gang box 420. Next, FIG. 8b demonstrates an access point (AP) 510 and a cable (CATV) 526 cooperatively mounted with respect to a single gang box 520. FIG. 8c demonstrates an access point (AP) 610 and an electrical outlet 660 cooperatively mounted with respect to a dual gang box 620. Finally, FIG. 8d demonstrates an access point (AP) 710, a cable (CATV) 726, an electrical outlet 760, and a voice/data jack 762 cooperatively mounted with respect to a triple gang box 720.

Figures 9A, 9B:
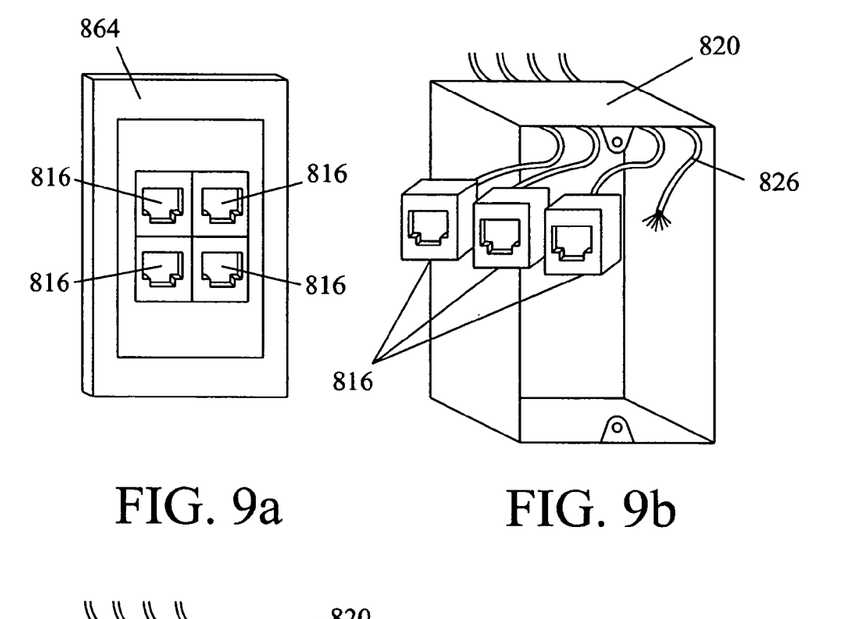
FIGS. 9a to 9d depict an exemplary retrofit installation according to the present disclosure.
Figures 9C, 9D:
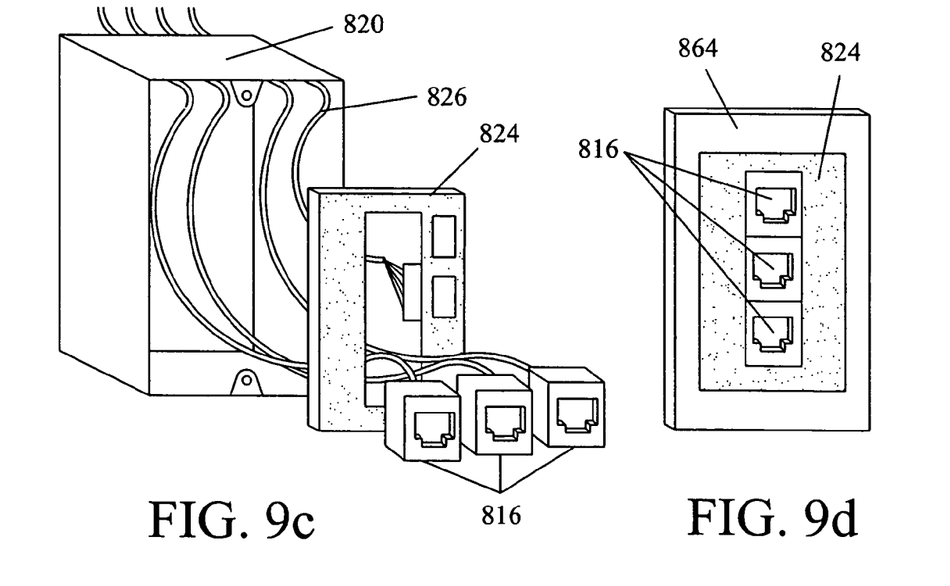

Having identified and described various embodiments, aspects and features associated with the access point (AP) of the present disclosure, it is specifically noted that each of the disclosed access points (AP) may be configured and dimensioned so as to be operatively associated with either an existing workstation outlet box (e.g., retrofit construction) or a new workstation outlet box (e.g., new construction). For instance, with reference to FIGS. 9a to 9d, an exemplary retrofit installation is demonstrated. FIG. 9a depicts a conventional existing wall mounted network workstation with a wall cover 864 and four (4) RJ45 jacks 816 associated therewith. As shown in FIG. 9b, the wall cover 864 may be separated from an outlet box 820 and the jacks 816 disassembled with at least one jack 816 removed to thereby expose the network cable 826 (e.g., Cat 5e/Cat 6). Subsequently, as demonstrated in FIG. 9c, the cable 826 may be advantageously connected to Wi-Fi access point circuitry 824 as previously described herein (e.g., via one or more 110 blocks associated therewith and/or an additional jack 817 suitable to provide an IDC punch down connection and/or any other suitable means for effecting such connection, as is currently known or as may become known). As shown in FIG. 9d, the remaining jacks 816 are repositioned (e.g., in a central plane as shown) and a faceplate 838 mounted with respect thereto.

It is noted that in other aspects of the present disclosure, the Wi-Fi access point circuitry 824 may be accommodated by a housing 812 such as disclosed herein or structures of similar construction. Thus, an exemplary technique for retrofitting an existing network location to support a Wi-Fi access point (AP) as well as other wired functionalities is provided by the present disclosure. Alternative retrofitting techniques may be employed without departing from the spirit or scope of the present disclosure, as will be readily apparent to persons skilled in the art.

Each of the disclosed access points (AP) may incorporate additional structural features and/or functions. For example, ventilation openings (e.g., vents 14) or alternative ventilation means may be incorporated into the design of the disclosed devices/systems, to facilitate heat dissipation. The amount of heat generated by the disclosed access point devices and systems will vary (e.g., based on the components associated with the disclosed device/system). However, in exemplary embodiments of the disclosed access point (AP), it is anticipated that as much as 10 watts will be generated by the applicable access point circuitry. Ventilation openings may be provided on the top, bottom and/or sides of the disclosed access points/systems to facilitate dissipation of such heat.

As numerous exemplary access points are disclosed herein that offer significant advantages and benefits previously unavailable, it will be readily apparent to those skilled in the art that the disclosed models/implementations offer a variety of integrated access point solutions. Some examples of such solutions may include (i) a large access point equipped with diversity antennas located at the periphery of the access points so as to minimize negative interference and improve performance, (ii) a single gang access point equipped with at least one antenna that may be implemented, for example, with complementary jacks for data, voice, video or audio applications, (iii) a stand alone access point product well suited for operatively cooperating with conventional workstation outlet boxes in new construction, (iv) an access point well suited for substitute/retrofit installation applications and/or as a complement to an existing wiring device, (v) a stand alone access point with cable management features, and/or (vi) an access point providing better security and improved performance.

Although the access points (AP) of the present disclosure have been described with reference to exemplary embodiments, aspects and implementations thereof, the present disclosure is not limited to such. Rather, the present disclosure extends to and encompasses changes, modifications and/or variations thereof which will be apparent to persons skilled in the art based on the present disclosure, and such changes, modifications and/or variations are encompassed within the spirit and scope of the present disclosure.

What is claimed is:

1. A wireless access point adapted to communicate with a wired network having at least one service cable with a free end accessible in proximity to a standard outlet box defining an outlet box interior region, comprising:
   a. a housing having a first plate defining a first plane, a second plate defining a second plane that is substantially parallel to the first plane and an intermediate housing region extending between the first plane defined by the first plate and the second plane defined by the second plate;
   b. electronic circuitry providing communication functionality positioned within the housing in the intermediate housing region;
   c. a pair of antennae adapted for Wi-Fi (wireless fidelity) communications positioned within the housing in the intermediate housing region; and
   d. at least one jack in electrical communication with the electronic circuitry, the at least one jack being mounted with respect to the housing;
   wherein the housing is adapted to be mounted with respect to the standard outlet box with (i) the second plate positioned external to the outlet box interior region and mounted with respect to the standard outlet box, (ii) the first plate also positioned external to the outlet box interior region, and (iii) the at least one jack positioned within the outlet box interior region for electrically connecting the electronic circuitry to the accessible free end of the service cable of the wired network at a conductive junction positioned within the outlet box interior region.

2. A wireless access point in accordance with claim 1, wherein the second plate defines a mounting plate of the housing configured and dimensioned to permit the wireless access point to be installed with respect to the outlet box, and the first plate defines a cover plate of the housing detachably engaged with the mounting plate such that the intermediate housing region is defined within the housing between the cover plate and the mounting plate.

3. A wireless access point in accordance with claim 1, wherein the intermediate housing region is positioned outside the outlet box interior region when the housing is mounted with respect to the standard outlet-box.

4. A wireless access point in accordance with claim 1, wherein the at least one jack is positioned behind the mounting plate.

5. A wireless access point in accordance with claim 1, wherein the housing includes vent openings disposed adjacent the intermediate housing region for venting heat therefrom.

6. A wireless access point in accordance with claim 5, wherein the vent openings are defined in the cover plate.

7. A wireless access point in accordance with claim 1, wherein at least one antenna of the pair of antennae is mounted with respect to the cover plate.

8. A wireless access point in accordance with claim 1, wherein the mounting plate of the housing is configured and dimensioned to permit the wireless access point to be mounted to at least one predefined workstation gang box selected from the group consisting of a single gang box, a double gang box, a triple gang box, and a multiple gang box.

9. A wireless access point in accordance with claim 1, wherein the mounting plate of the housing is configured and dimensioned to permit the wireless access point to be mounted to at least one selected from the group consisting of an electrical box having a rectangular pattern, and an electrical box having a circular pattern.

10. A wireless access point in accordance with claim 1, wherein the second plate defines a front face facing the first plate, a rear face facing away from the first plate, and a mounting opening extending through the second plate, and wherein the at least one jack is mounted with respect to the second plate adjacent the mounting opening.

11. A wireless access point in accordance with claim 1, wherein at least one antenna of the pair of antennae is a diversity antenna.

12. A wireless access point in accordance with claim 1, further comprising at least one cable management structure positioned with respect to the first and second plates within the housing.

13. A wireless access point in accordance with claim 12, wherein the cable management structure is positioned to minimize RF interference stemming from electrical components associated with the wireless access point.

14. A wireless access point in accordance with claim 13, wherein the electronic circuitry includes one or more cables, the pair of antennae, and a printed circuit board.

15. A wireless access point in accordance with claim 12, wherein the cable management structure includes one or more cable guide structures configured to direct cable connected to the antennae within the housing of the wireless access point device.

16. A wireless access point assembly for connecting to a wired network, comprising:
   a. electronic circuitry defining a wireless access point;
   b. a housing with
      i. a first plate defining a first plane, and a second plate defining a second plane that is substantially parallel to said first plane; wherein an intermediate housing region is defined between the first plane defined by the first plate and the second plane defined by the second plate, said housing containing the electronic circuitry;
      ii. a pair of antennae adapted for Wi-Fi (wireless fidelity) communications positioned within the housing in the intermediate housing region; and
      iii. at least one jack mounted with respect to said second plate extending through the housing and positioned outside said intermediate housing region; and
   c. an outlet box defining an internal box region;
   d. a cable connected at one end to the wired network and terminating in the internal box region of the outlet box at the other end,
   wherein the wireless access point is installed with respect to the outlet box with the at least one jack positioned in the internal box region to connect to the other end of the cable and the intermediate housing region is positioned outside the internal box region.

17. A wireless access point assembly in accordance with claim 16, wherein the second plate defines a mounting plate of the housing configured and dimensioned to permit the wireless access point to be installed with respect to the outlet box, and the first plate defines a cover plate of the housing detachably engaged with the mounting plate such that the intermediate housing region is defined within the housing between the cover plate and the mounting plate.

18. A wireless access point in accordance with claim 16, wherein the at least one jack is positioned behind the mounting plate.

19. A wireless access point in accordance with claim 16, wherein the housing includes vent openings disposed adjacent the intermediate housing region for venting heat therefrom.

20. A wireless access point in accordance with claim 19, wherein the vent openings are defined in the cover plate.

21. A wireless access point in accordance with claim 16, wherein at least one antenna of the pair of antennae is mounted with respect to the cover plate.

22. A wireless access point in accordance with claim 16, wherein the box is selected from the group consisting of a single gang box, a double gang box, a triple gang box, and a multiple gang box.

23. A wireless access point in accordance with claim 16, wherein the at least one jack is in electronic communication with the access point circuitry.

24. A wireless access point in accordance with claim 16, wherein the second plate defines a front face facing the first plate, a rear face facing away from the first plate, and a mounting opening extending through the second plate, and wherein the at least one jack is mounted with respect to the second plate adjacent the mounting opening.

25. A wireless access point in accordance with claim 16, wherein at least one antenna of the pair of antennae is a diversity antenna.

26. A wireless access point in communication with a wired network having a cable with an end connected to the wired network and a free end extensible into an outlet box, comprising:
   a. a back plate defining a mounting plate configured and dimensioned to interface with a corresponding front face of the outlet box for purposes of installing the wireless access point with respect thereto, and a cover plate dis posed in front of the mounting plate detachably mounted with respect to the back plate, wherein an intermediate housing region is defined between the cover plate and the back mounting plate;

b. a pair of antennae adapted for Wi-Fi (wireless fidelity) communications positioned in the intermediate housing region; and c. at least one jack mounted with respect to the back plate extending through the mounting plate to a position behind the mounting plate to enable connection of the wireless access point to the free end of the cable contained within the outlet box.

\* \* \* \* \*